United States Patent
Kobayashi et al.

(10) Patent No.: US 11,884,778 B2
(45) Date of Patent: Jan. 30, 2024

(54) SILICONE COMPOSITION, A RELEASE SHEET, A RELEASE FILM AND METHODS FOR PREPARING THE RELEASE SHEET AND THE RELEASE FILM

(71) Applicant: Shin-Etsu Chemical Co., Ltd., Tokyo (JP)

(72) Inventors: Ataru Kobayashi, Annaka (JP); Ken Nakayama, Annaka (JP); Toshiaki Ihara, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 626 days.

(21) Appl. No.: 17/256,724

(22) PCT Filed: Jun. 27, 2019

(86) PCT No.: PCT/JP2019/025736
§ 371 (c)(1),
(2) Date: Dec. 29, 2020

(87) PCT Pub. No.: WO2020/009007
PCT Pub. Date: Jan. 9, 2020

(65) Prior Publication Data
US 2021/0277186 A1    Sep. 9, 2021

(30) Foreign Application Priority Data

Jul. 3, 2018  (JP) .................................. 2018-126697

(51) Int. Cl.
*C08G 77/12* (2006.01)
*B05D 5/10* (2006.01)
*B05D 7/04* (2006.01)
*C08G 77/08* (2006.01)
*C08L 83/04* (2006.01)
*C09J 183/04* (2006.01)

(52) U.S. Cl.
CPC ............... *C08G 77/12* (2013.01); *B05D 5/10* (2013.01); *B05D 7/04* (2013.01); *C08G 77/08* (2013.01); *C08L 83/04* (2013.01); *C09J 183/04* (2013.01); *B05D 2252/00* (2013.01); *B05D 2518/10* (2013.01); *C09J 2483/005* (2013.01)

(58) Field of Classification Search
CPC .......... C08G 17/12; C08G 77/08; B05D 5/10; B05D 7/04; B05D 2252/00; B05D 2518/10; C08L 83/04; C09J 183/04; C09J 2483/005
USPC .................................................. 106/287.14
See application file for complete search history.

(56) References Cited

FOREIGN PATENT DOCUMENTS

JP    S63234061 A    9/1988
JP    2007099938 A    4/2007
(Continued)

OTHER PUBLICATIONS

English translation of International Search Report corresponding to International Patent Application No. PCT/JP2019/025736 (2 pages) (dated Oct. 1, 2019).

*Primary Examiner* — Douglas B Call
(74) *Attorney, Agent, or Firm* — Myers Bigel, P.A.

(57) ABSTRACT

The object of the present invention is to provide a silicone composition which provides a release coating having excellent adhesion to a substrate, in particular a plastic film substrate, such as a polyester film. Further, an object of the present invention is to provide a release sheet having a cured coating of the silicon composition. It is also an object of the present invention to provide a silicone composition which has improved storage stability and does not cause separation of the functional compound during long-term storage or transportation. The present invention provides a silicone composition comprising the following components (A) to (C):

(A) an organopolysiloxane having at least two alkenyl groups each bonded to a silicon atom in a molecule, having a viscosity at 25 degrees C. in the range of from 50 mPa·s to 10,000 mPa·s, and having no aryl nor aralkyl group bonded to a silicon atom, wherein a percentage of the number of the alkenyl groups relative to the number of groups each bonded to a silicon atom is from 0.01% to less than 4.5%;

(B) a mixture comprising the following components (B1), (B2) and (B3):
(B1) an alpha-olefin which is liquid at 25 degrees C., in an amount of 0.05 to 15 parts by mass, relative to 100 parts by mass of component (A),
(B2) an organohydrogenpolysiloxane having at least three hydrogen atoms each bonded to a silicon atom in a molecule, and having no aryl nor aralkyl group bonded to a silicon atom, wherein a ratio of the number of the SiH groups present in component (B2) to a total number of the alkenyl groups present in components (A) and (B) is 0.5 to 10;
(B3) an organohydrogenpolysiloxane having at least three hydrogen atoms each bonded to a silicon atom in a molecule, and having an aryl group and/or an aralkyl group each bonded to a silicon atom such that a percentage of the number of the aryl group and the aralkyl group relative to a total number of hydrogen atoms and groups each bonded to a silicon atom is 8% to 50%, wherein the amount of component (B3) is from 0.05 to 10 parts by mass, relative to 100 parts by mass of component (A), and a ratio of the number of the SiH groups present in component (B3) to a total number of the alkenyl groups present in components (A) and (B) is 0.1 to 2; and (C) a catalytic amount of a platinum group metal catalyst.

20 Claims, No Drawings

(56) References Cited

FOREIGN PATENT DOCUMENTS

| | | | |
|---|---|---|---|
| JP | 2008214497 A | | 9/2008 |
| JP | 2010037557 A | | 2/2010 |
| JP | 2016053107 A | | 4/2016 |
| JP | 2018012827 A | | 1/2018 |
| WO | WO2018012296 | * | 1/2018 |

* cited by examiner

SILICONE COMPOSITION, A RELEASE SHEET, A RELEASE FILM AND METHODS FOR PREPARING THE RELEASE SHEET AND THE RELEASE FILM

TECHNICAL FIELD

The present invention relates to a silicone composition, in particular of a solvent-free type, which provides a cured layer having improved adhesion to a substrate, in particular a plastic film substrate such as a polyester film. It also relates to release sheet or a release film having a coating of the cured composition.

BACKGROUND ART

Conventionally, a coating of a cured product of a silicone composition is formed on a surface of a sheet-like substrate such as paper or a plastic sheet, in order to impart, to the substrate, releasability from an adhesive material (e.g., a property of being cleanly peeled off from an adhesive material). A method for forming a coating of a cured silicone composition on a substrate surface is described in, for example, Japanese Patent Application Laid-Open No. Sho 47-32072 (Patent Literature 1), in which a releasable coating is formed on the substrate surface by the addition reaction between an organopolysiloxane having alkenyl groups and an organohydrogenpolysiloxane in the presence of a platinum-based catalyst.

Silicone compositions curable by the addition reaction to form a coating may be categorized into three types: a solvent-type in which the silicone composition is dissolved in an organic solvent; an emulsion-type in which the silicone composition is dispersed in water using an emulsifier; and a solvent-free type. The solvent-type composition has a disadvantage that it is harmful to the human body and the environment. The emulsion-type composition has problems that it requires a high energy input for water removal, and that the emulsifier remains in a coating after curing, resulting in a coating with reduced adhesion to the substrate. Therefore, a solvent-free type silicone composition is desirable.

However, conventional solvent-free-type silicone compositions have a problem that they show poor adhesion to plastic films such as polyester films and polypropylene films, although they show good adhesion to paper substrates.

The adhesion of a solvent-free-type silicone composition to a film substrate may be improved by, for example, adding a silane coupling agent to a silicone composition, or subjecting the surface of a substrate to an adhesion-enhancing treatment or a primer treatment prior to application of the composition. However, solvent-free-type silicone compositions containing a silane coupling agent are still unsatisfactory in adhesion to the substrate. The surface treatment of a substrate has a disadvantage that an additional process step is required.

Japanese Patent Application Laid-Open No. Hei 6-220327 (Patent Literature 2) discloses a solvent-free-type silicone composition comprising a base polymer having a branched structure with $RSiO_{3/2}$ units, and describes that the silicone composition shows improved adhesion between the resulting cured coating and a substrate. The adhesion to an OPP (oriented polypropylene) film is improved, but the adhesion to a polyester-based film substrate is still unsatisfactory.

A method for improving adhesion is known by adding a functional compound which interacts with a substrate. However, the compound having a functional group has low compatibility with a base silicone composition. The silicone composition comprising the functional compound has a problem such that the functional compound separates from the silicone composition during long-term storage or transportation. If the composition after the separation is used as it is, the envisaged property may not be attained. Therefore, when the functional compound is added to a silicone composition and the composition is stored for a long period of time or transported, care is needed so that the functional compound does not separate over time.

Japanese Patent Application Laid-Open No. 2011-132532 (Patent Literature 3) describes a method for enhancing adhesion of a silicone composition to a substrate, on account of adding a small amount of an organopolysiloxane having an epoxy group to the silicone composition. However, this document describes only solvent-type silicone compositions in the Examples, and is silent on adhesion properties and storage stability of the composition obtained by the addition of the organopolysiloxane having an epoxy group.

Japanese National Phase Publication No. 2010-500462 (Patent Literature 4) describes that the addition of a reaction product of a fluid polyorganosiloxane having alkenyl group(s) and silanol group(s) with a hydrolysable silane having epoxide group(s), as a functional compound, to a solvent-free-type silicone composition attains a cured coating having improved adhesion to a substrate. However, this document is silent on release properties and storage stability of the release coating composition.

Japanese Patent Application Laid-Open No. 2018-12827 (Patent Literature 5) describes that, in an addition-reactive silicone composition comprising an alkenyl group-containing organopolysiloxane and an aryl group-containing organohydrogenpolysiloxane, the specific content ratio of the aryl groups between the alkenyl group-containing organopolysiloxane and the aryl group-containing organohydrogenpolysiloxane gives good adhesion to a film substrate such as a polyester film substrate, even when the composition is free of a solvent. Patent Literature 5 describes that two polysiloxanes having a greatly different content ratio of the aryl groups have low compatibility with each other, but does not refer to storage stability. Thus, it is unknown what composition gives stability in long-term storage and transportation.

Components having low compatibility with each other, such as the functional compound and a silicone composition, become miscible by use of a hydrocarbon-based solvent such as toluene or hexane as a compatibilizer. However, as described above, a solvent is harmful to a human body and the environment, so that it is difficult to use a solvent (or compatibilizer) which does not react with the addition-reactive silicone composition. Therefore, a compatibilizer which reacts with an addition-reactive silicone composition and is not harmful to a human body and the environment has been desired.

Japanese Patent Application Laid-Open No. 2007-99938 (Patent Literature 6) describes a silicone peeling-treatment agent which comprises an alpha-olefin being liquid at 23 degrees C. in order to reduce the viscosity of the peeling agent. However, Patent Literature 6 does not refer to storage stability of the peeling treatment agent. Patent Literature 6 evaluates a release property from polyethylene laminate paper, but does not refer to adhesion, particularly adhesion to a film.

PRIOR ART LITERATURES

Patent Literatures

Patent Literature 1: Japanese Patent Application Laid-Open No. Sho 47-32072, 1972
Patent Literature 2: Japanese Patent Application Laid-Open No. Hei 6-220327, 1994
Patent Literature 3: Japanese Patent Application Laid-Open No. 2011-132532
Patent Literature 4: Japanese National Phase Publication No. 2010-500462
Patent Literature 5: Japanese Patent Application Laid-Open No. 2018-12827
Patent Literature 6: Japanese Patent Application Laid-Open No. 2007-99938

SUMMARY OF THE INVENTION

Problems to be Solved by the Invention

When the present inventors found that when the functional compounds described in Patent Literatures 3 to 5 is added to a solvent-free silicone composition, all of the compositions became white turbid, and the functional compound separated in several weeks to several months. Further, adhesion of the resulting composition to a film is insufficient and a solvent-free silicone composition having high adhesion to a film and high storage stability cannot be obtained. Therefore, a solvent-free silicone composition having good adhesion to a film and, in particular, good storage stability is desired.

The present invention has been made in such circumstances. One of the objects of the present invention is to provide a silicone composition which provides a release coating having excellent adhesion to a substrate, in particular a plastic film substrate, such as a polyester film. Further, another object of the present invention is to provide a release sheet having a cured coating of the silicon composition. It is also an object of the present invention to provide a silicone composition which has improved storage stability so that the functional compound does not separate during long-term storage or transportation.

Means to Solve the Problems

As a result of intensive researches to attain the objects described above, the present inventors have found that separation of a functional compound is suppressed by the following mixture (B) are prepared in advance, and separately storing the following component (A), the following mixture (B) and the following component (C) and these components (A) to (C) are mixed shortly before, preferably 48 hours before, application to prepare a silicone composition.

For improving adhesion to a substrate, it has been known since long ago to have the number of hydrogen atoms bonded to silicon atoms in a silicone composition. This is presumably because larger the hydrogen atoms bonded to a silicon atom and a substrate interact with each other. In the present invention, an aryl group-containing organohydrogenpolysiloxane enhances such interaction to provide a release layer having excellent adhesion to a film substrate. Although the aryl group-containing organohydrogenpolysiloxane is not compatible with usual silicone compositions having no aryl group, an alpha-olefin works in the present invention to compatibilize the aryl group-containing organohydrogenpolysiloxane with a silicone composition having no aryl group. In particular, in the method for preparing a release sheet or film of the present invention, the following components (A), (B) and (C) for the silicone composition are separately stored and, then, mixed before applied, so that the functional compound does not separate during long-term storage or transportation to attain high storage stability of the silicone composition.

Thus, the present invention provides a silicone composition comprising the following components (A) to (C):

(A) an organopolysiloxane having at least two alkenyl groups each bonded to a silicon atom in a molecule, having a viscosity at 25 degrees C. in the range of from 50 mPa·s to 10,000 mPa·s, and having no aryl nor aralkyl group bonded to a silicon atom, wherein a percentage of the number of the alkenyl groups relative to the number of groups each bonded to a silicon atom is from 0.01% to less than 4.5%;

(B) a mixture comprising the following components (B1), (B2) and (B3):

(B1) an alpha-olefin which is liquid at 25 degrees C., in an amount of 0.05 to 15 parts by mass, relative to 100 parts by mass of component (A), (B2) an organohydrogenpolysiloxane having at least three hydrogen atoms each bonded to a silicon atom in a molecule, and having no aryl nor aralkyl group bonded to a silicon atom, wherein a ratio of the number of the SiH groups present in component (B2) to a total number of the alkenyl groups present in components (A) and (B) is 0.5 to 10;

(B3) an organohydrogenpolysiloxane having at least three hydrogen atoms each bonded to a silicon atom in a molecule, and having an aryl group and/or an aralkyl group each bonded to a silicon atom such that a percentage of the number of the aryl group and the aralkyl group relative to a total number of hydrogen atoms and groups each bonded to a silicon atom is 8% to 50%, wherein the amount of component (B3) is from 0.05 to 10 parts by mass, relative to 100 parts by mass of component (A), and a ratio of the number of the SiH groups present in component (B3) to a total number of the alkenyl groups present in components (A) and (B) is 0.1 to 2; and (C) a catalytic amount of a platinum group metal catalyst.

The present invention further provides a release sheet comprising a substrate and a release layer on at least one surface of the substrate, wherein the release layer is formed from a cured product of the silicone composition, and provides a method for preparing the same. The present invention further provides a release film comprising a release layer formed from a cured product of the silicone composition.

In the present specification, the term "aryl" sometimes comprehensively mean aryl and/or aralkyl, for example, the aralkyl group includes a phenyl group possessed by a benzyl group (phenylmethyl group) and a phenethyl (phenylethyl group).

Effects of the Invention

The silicone composition of the present invention gives a cured film having excellent adhesion to a substrate, particularly a plastic film substrate. The silicone composition of the present invention has high storage stability, so that long-term storage and transportation is possible without separation of the substrate functional component over time.

DETAILED DESCRIPTION OF THE PREFERRED EMBODIMENTS

The present invention will be described in more detail.

[(A) Alkenyl Group-Containing Organopolysiloxane Having No Aryl Group]

Component (A) is an organopolysiloxane having at least two alkenyl groups per molecule and having no aryl group such that the percentage of the number of the alkenyl groups relative to the number of groups each bonded to a silicon atom is from 0.01% to less than 4.5%. Component (A) has a viscosity of 50 mPa·s or more and 10,000 mPa·s or less at 25 degrees C. The organopolysiloxane may be any alkenyl group-containing organopolysiloxane conventionally used in addition-curable silicone compositions as long as satisfying the aforesaid requirements.

Organopolysiloxane (A) has at least two alkenyl groups. If it has less than two alkenyl groups, it is quite likely that uncrosslinked molecules remain after curing of the composition, resulting in undesirably low curability. Preferably, the percentage of the number of the alkenyl groups relative to the number of groups each bonded to a silicon atom is from 0.01% to less than 4.5%, and more preferably from 0.02% to less than 4.0%. If the percentage of the alkenyl groups is less than the lower limit indicated above, the curability may be worse. If the percentage of the alkenyl groups exceeds the upper limit indicated above, the resulting cured coating may be of heavy peeling (i.e., requiring a larger force to peel an adhesive material from the cured coating). That is, after the adhesive material is applied on the release layer of the cured coating and is then peeled off therefrom, the adhesion strength of the adhesive material (hereinafter referred to as "remaining adhesion") is made lower. Examples of the group bonded to a silicon atom include hydroxy, alkyl and alkyl groups substituted with halogen atom(s), and more specifically, groups represented by $R^3$ described below.

Preferably, component (A) has a viscosity at 25 degrees C. in the range of from 50 mPa·s to 10,000 mPa·s, in particular from 50 mPa·s to 5,000 mPa·s, further from 50 mPa·s to 1,000 mPa·s. In a case where two or more of the organopolysiloxanes are used in combination, it is preferable that component (A) as a whole has a viscosity of at most 10,000 mPa·s. If the viscosity exceeds this limit, the coating ability of the composition may undesirably deteriorate. It should be noted that the viscosity herein may be determined with a rotational viscometer (hereinafter the same).

Component (A) is preferably represented by the general formula (3) shown below. The organopolysiloxane may be used alone, or in combination of two or more of them. It should be noted that the sequence of the siloxane units shown in the parentheses is for an illustrative purpose only, and is not limited thereto or thereby.

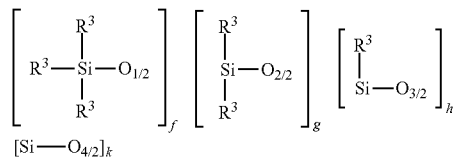

wherein, $R^3$ is, independently of each other, a hydroxy group, an alkenyl group having 2 to 12 carbon atoms, a monovalent hydrocarbon group having an alkenyl group(s) and 2 to 12 carbon atoms and optionally containing an oxygen atom(s), or a substituted or unsubstituted monovalent hydrocarbon group having no aliphatic unsaturated bond, provided that $R^3$ is not an aryl group nor an aralkyl group. The organopolysiloxane has at least two alkenyl groups per molecule.

Preferably, the monovalent hydrocarbon group having no aliphatic unsaturated bond has 1 to 10 carbon atoms. Examples thereof include alkyl groups, preferably, of 1 to 6 carbon atoms, such as methyl, ethyl, propyl and butyl groups; cycloalkyl groups, preferably, of 5 to 8 carbon atoms, such as a cyclohexyl group; and derivatives thereof in which a part or all of the hydrogen atoms each bonded to a carbon atom of the aforementioned groups are substituted with a substituent, such as a hydroxy or cyano group, a halogen atom, or an alkoxysilyl, polyoxyalkylene, epoxy or carboxyl group. In view of the releasability, alkyl groups are especially preferred, particularly methyl, ethyl and propyl groups.

Examples of the alkenyl group include alkenyl groups, such as vinyl, allyl, hexenyl and octenyl groups; and cycloalkenylalkyl groups, such as a cyclohexenylethyl group. Examples of the monovalent hydrocarbon group containing alkenyl group(s) and optionally oxygen atom(s) include acryloylalkyl and methacryloylalkyl groups, such as acryloylpropyl, acryloylmethyl and methacryloylpropyl groups. The group may optionally have an ether bond in a methylene chain, e.g., —(CH$_2$)$_2$—O—CH$_2$—CH=CH$_2$ and —(CH$_2$)$_3$—O—CH$_2$—CH=CH$_2$. Among these, a vinyl group is preferred in an industrial point of view.

In the formula (3) above, f is an integer of at least 2, preferably from 2 to 300, g is an integer of at least 1, preferably an integer of 10 to 1,000, more preferably an integer of 100 to 500, h is an integer of at least 0, preferably 0 to 100, more preferably 0 to 50, k is an integer of at least 0, preferably 0 to 100, more preferably 0 to 50, and 30≤f+g+h+k≤1,000, preferably 50≤f+g+h+k≤500, further preferably 100≤f+g+h+k≤300. If the value of f+g+h+k is less than the lower limit, coating ability of the obtained composition may be poor. If the value of f+g+h+k exceeds the upper limit, the viscosity of the polyorganosiloxane is too high and, consequently, the viscosity of the obtained silicone composition is too high, so that coating ability may be poor.

Examples of organopolysiloxane (A) include, but not limited to, those shown below. In the formulas shown below, Me and Vi stand for a methyl group and a vinyl group, respectively. It should be also noted that the sequence of the siloxane units in parentheses is for an illustrative purpose only, and is not limited thereto or thereby.

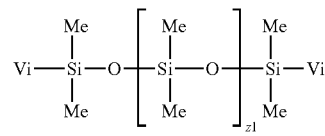

wherein 20≤z1≤1000.

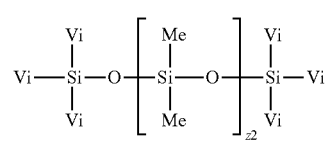

wherein $70 \leq z2 \leq 1000$.

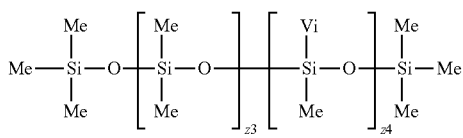

wherein $10 \leq z3 \leq 1000$ and $2 \leq z4 \leq 100$.

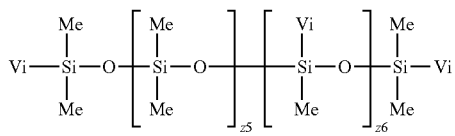

wherein $10 \leq z5 \leq 1000$ and $1 \leq z6 \leq 100$.

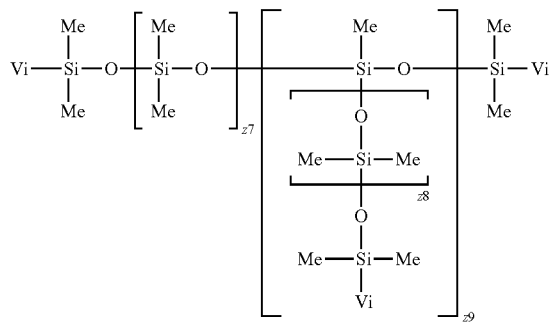

wherein $0 \leq z7 \leq 1000$, $0 \leq z8 \leq 1000$ and $1 \leq z9 \leq 100$.

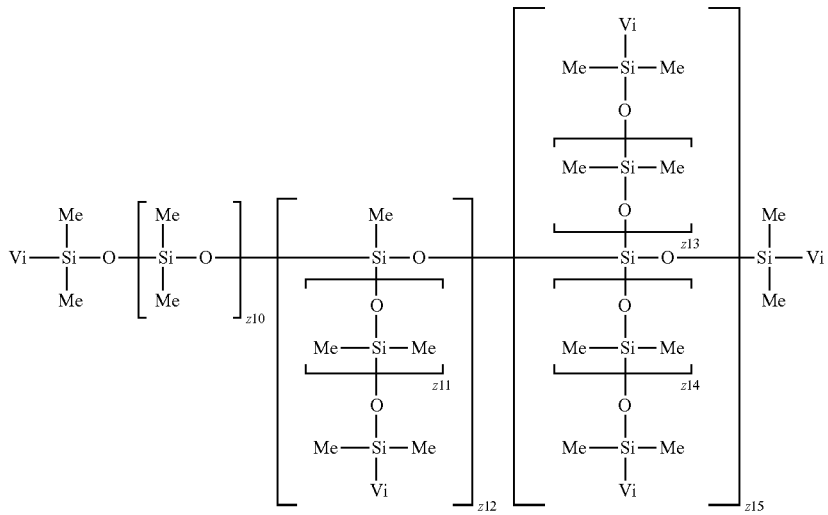

wherein $0 \leq z10 \leq 1000$, $0 \leq z11 \leq 1000$, $0 \leq z12 \leq 100$, $0 \leq z13 \leq 1000$, $0 \leq z14 \leq 1000$ and $1 \leq z15 \leq 100$.

(B) Mixture Comprising the Following Components (B1) to (B3) and Optional Component (B4)

The silicone composition of the present invention comprises a mixture (B) comprising the following components (B1) to (B3) and optional component (B4), component (A) described above, and component (C) described below.

(B1) an alpha-olefin which is liquid at 25 degrees C., (B2) an organohydrogenpolysiloxane having at least three hydrogen atoms each bonded to a silicon atom in a molecule, and having no aryl nor aralkyl group bonded to a silicon atom, (B3) an organohydrogenpolysiloxane having at least three hydrogen atoms each bonded to a silicon atom in a molecule, and having an aryl group and/or an aralkyl group each bonded to a silicon atom such that a percentage of the number of the aryl group and the aralkyl group relative to a total number of hydrogen atoms and groups each bonded to a silicon atom (hereinafter referred to as a percentage of the ar(alk)yl groups) is 8% to 50%, and (B4) an organopolysiloxane having at least two alkenyl groups each bonded to a silicon atom in a molecule, having a percentage of the number of the alkenyl group relative to a total number of groups each bonded to a silicon atom is from 5% to less than 35%, having a viscosity at 25 degrees C. in the range of from 1 mPa·s to 60 mPa·s, and having no aryl nor aralkyl group bonded to a silicon atom.

If the aforesaid components (B2), (B3) and (B4) are mixed, component (B3) separates over time due to the low compatibility with components (B2) and (B4) having no aryl group. The alpha-olefin (B1) being liquid at 25 degrees C. is added as a compatibilizer to the mixture of the components (B2) to (B4) in the present silicone composition, so that separation of component (B3) is suppressed over time and the whole mixture (B) is excellent in storage stability. Further, the alpha-olefin (B1) reacts with organohydrogenpolysiloxane, so that the obtained composition is highly safe for a human body and the environment.

Components (B1) to (B4) will be described below in detail.

[(B1) Alpha-Olefin]

The alpha-olefin is not particularly limited as long as it is liquid at 25 degrees C. It may be appropriately selected from conventional alpha-olefins. The alpha-olefin may be used alone, or in combination of two or more of them.

The alpha-olefin may be linear or branched. The linear alpha-olefin preferably have the number of carbon atoms of 10 to 18, more preferably 12 to 18. If the number of carbon atoms exceeds the aforesaid upper limit, it may be solid at 25 degrees C. If the number of carbon atoms is smaller than the aforesaid lower limit, volatility is too high, and therefore, it may be harmful to a human body and the environment. Examples of the linear alpha-olefin include 1-tetradecene, 1-hexadecene, and 1-octadecene. More particularly, commercially available products of a series of trade names "LINEALENE", ex Idemitsu Kosan Co., Ltd., such as trade names of "LINEALENE 14", "LINEALENE 16" and "LINEALENE 18" may be used.

The branched alpha-olefin preferably have, the number of carbon atoms of 10 or more from the viewpoint of volatility. Examples of the branched alpha-olefin include a commercially available product of a series of trade name "HS dimer" such as "A-20" and "A-20P", ex Hokoku Corporation, which are represented by the following formula.

HS-Dimer A-20

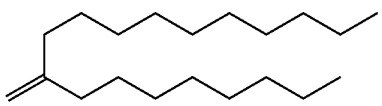 [SMILES: C=C(CCCCCCCC)CCCCCCCCCC]

HS-Dimer A-20P

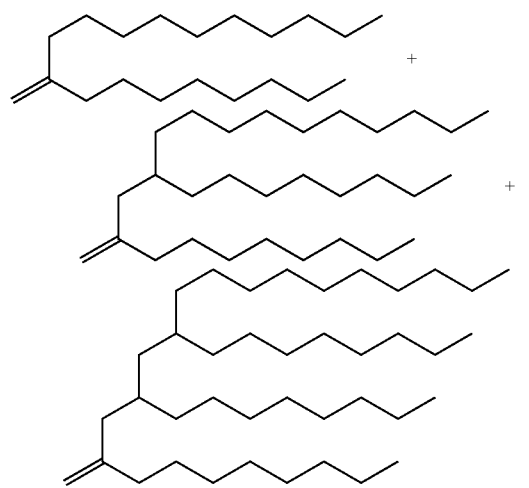

The amount of alpha-olefin (B1) is from 0.05 to 15 parts by mass, particularly from 0.1 to 10 parts by mass, relative to 100 parts by mass of component (A). If the amount exceeds the upper limit, the coating ability of the composition may poor. If the amount is less than the lower limit, the effect as a compatibilizer may not be obtained, so that the storage stability of component (B) may poor.

[(B2) Organohydrogenpolysiloxane Having No Aryl Nor Aralkyl Group]

Component (B) is an organohydrogenpolysiloxane having at least three hydrogen atoms each bonded to a silicon atom in a molecule, and having no aryl nor aralkyl group bonded to a silicon atom. The organohydrogenpolysiloxane may be used alone, or in combination of two or more of them.

Curing occurs through the addition reaction between the SiH groups in the organohydrogenpolysiloxane (B2) and the alkenyl groups in component (A), optional component (B4) and component (B1), resulting in the formation of a coating. The amount of component (B2) is such that the ratio of the number of the SiH groups in component (B2) to the number of the alkenyl groups in component (A), optional component (B4) and component (B1) is 0.5 to 10, preferably 0.6 to 8, and more preferably 0.7 to 5. If the ratio is less than the lower limit indicated above, the resulting cured coating may have low adhesion to the substrate. If the ratio exceeds the upper limit indicated above, the resulting cured coating may be of heavy peeling (i.e., requiring a larger force to peel an adhesive material from the cured coating). That is, after the adhesive material is applied on the release layer of the cured coating and is then peeled off therefrom, the adhesion strength of the adhesive material is made lower.

The organohydrogenpolysiloxane (B2) may be represented by, e.g., the following average compositional formula (5):

$$R^4_t H_u SiO_{(4-t-u)/2} \qquad (5)$$

wherein $R^4$ is, independently of each other, a hydroxy group or a substituted or unsubstituted monovalent hydrocarbon group having no aliphatic unsaturated bond, provided that $R^4$ is neither an aryl nor an aralkyl group; and t and u are the real number greater than 0, provided that $t+u \leq 3$.

The organohydrogenpolysiloxane has at least three hydrogen atoms each bonded to a silicon atom in one molecule.

Examples of the monovalent hydrocarbon group include alkyl groups, preferably, of 1 to 6 carbon atoms, such as methyl, ethyl, propyl and butyl groups; cycloalkyl groups, preferably, of 5 to 8 carbon atoms, such as cyclohexyl group; and monovalent hydrocarbon groups having 1 to 10 carbon atoms in which a part or all of the hydrogen atoms each bonded to a carbon atom of the aforementioned groups are substituted with a substituent, such as a hydroxy or cyano group, a halogen atom, or an alkoxysilyl, polyoxyalkylene, epoxy or carboxyl group. Among these, $R^4$ is preferably an alkyl group, more preferably methyl, ethyl or propyl groups in view of enhancing the rate of the addition reaction.

In the formula (5) above, t is the number of $t>0$, preferably from 0.1 to 2.0, u is the number of $u>0$, preferably from 0.1 to 3, and t and u satisfy $0<t+u \leq 3$, in particular $0.5<t+u \leq 2.9$.

The organohydrogenpolysiloxane (B2) may be any of linear chain, branched chain or cyclic, or a mixture thereof. Examples of the organohydrogenpolysiloxane include polymers or copolymers comprising at least one of $R^4 HSiO_{2/2}$, $HSiO_{3/2}$ and $R^4_2 HSiO_{1/2}$ units and, optionally, one or more of $R^4_2 SiO_{2/2}$, $R^4 SiO_{3/2}$ and $R^4_3 SiO_{1/2}$ units, wherein $R^4$ is as defined above. It preferably comprises at least three, more preferably 5 to 300, $R^4 HSiO_{2/2}$ and $R^4_2 HSiO_{1/2}$ units in total per molecule. It may further comprise $SiO_{4/2}$ units in such an amount that the benefits of the invention are not impaired.

The organohydrogenpolysiloxane comprise 3 to 300, more preferably 3 to 200, more preferably 5 to 100, SiH groups per molecule. If the number of the SiH group is less than the lower limit or exceeds the upper limit, the curability or adhesion may be worse.

Preferably, component (B2) has a viscosity at 25 degrees C. of from 0.001 to 10 Pa·s, in particular from 0.003 to 8 Pa-s, further preferably from 0.005 to 5 Pa·s. If the viscosity is too low, the curability may be worse. If it is too high, the workability may be worse.

Examples of component (B2) include, but not limited to, the compounds shown below. In the formulas shown below, Me stands for a methyl group. It should be noted that the sequence of the siloxane units shown in the parentheses is for an illustrative purpose only, and is not limited thereto or thereby.

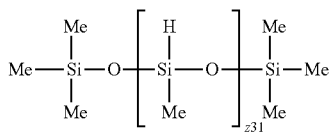

wherein $3 \leq z31 \leq 300$.

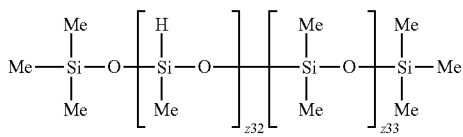

wherein $3 \leq z32 \leq 300$ and $1 \leq z33 \leq 500$.

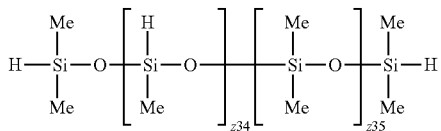

wherein $1 \leq z34 \leq 298$ and $0 \leq z35 \leq 500$.

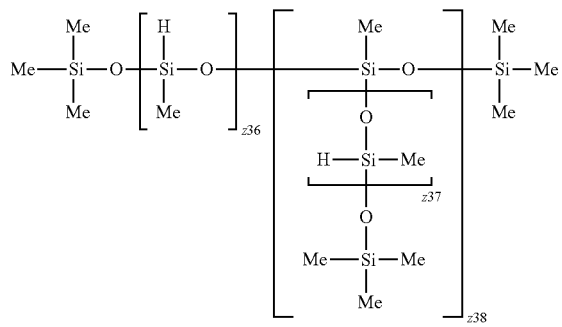

wherein $0 \leq z36 \leq 100$, $0 \leq z37 \leq 100$ and $1 \leq z38 \leq 50$.

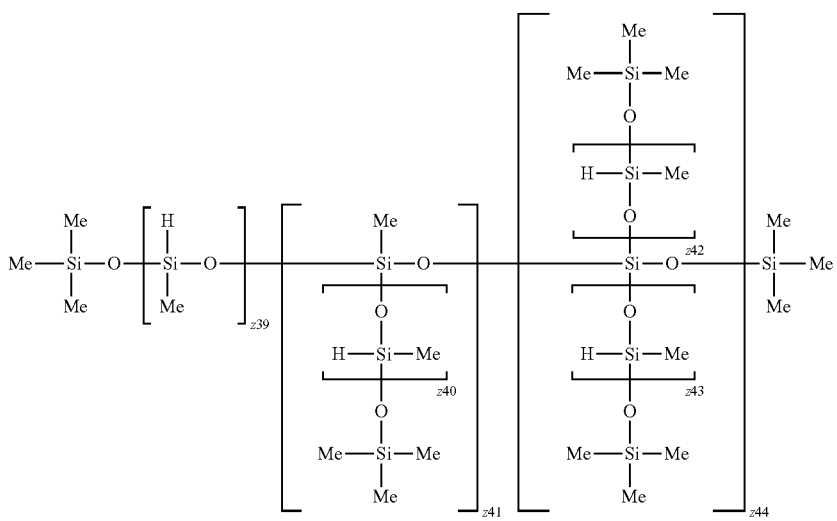

wherein $0 \leq z39 \leq 100$, $0 \leq z40 \leq 100$, $0 \leq z41 \leq 50$, $0 \leq z42 \leq 100$, $0 \leq z43 \leq 100$ and $1 \leq z44 \leq 50$.

[(B3) Organohydrogenpolysiloxan Having Aryl Groups]

Component (B3) is an organohydrogenpolysiloxane having at least three hydrogen atoms each bonded to a silicon atom in a molecule, and having an aryl group and/or an aralkyl group each bonded to a silicon atom such that the percentage of the number of the aryl groups relative to the total number of the hydrogen atoms and groups each bonded to a silicon atom is 8% to 50%, the term "aryl" comprehensively mean aryl and/or aralkyl group each bonded to a silicon atom. The organohydrogenpolysiloxane may be used alone, or in combination of two or more thereof.

The amount of component (B3) is from 0.05 to 10 parts by mass, preferably 0.1 to 9 parts by mass, and more preferably 0.5 to 8 parts by mass, relative to 100 parts by mass of component (A), and is such that the ratio of the number of the SiH groups in component (B3) to the number of the alkenyl groups in component (A), optional component (B4) and component (B1) is between 0.1 and 2.0, preferably from 0.1 to less than 1.5, more preferably from 0.1 to 1.2, still more preferably from 0.2 to 1.0. If the amount is less than the lower limit, the resulting cured coating may show low adhesion to a substrate. If the amount exceeds the upper limit, storage stability of component (B) may be poor and the resulting cured coating may be of heavy peeling. It is also preferable that the amount of component (B3) is at least 20 parts by mass, preferably from 30 to 90 parts by mass, and more preferably from 35 to 85 parts by mass, per total 100 parts by mass of components (B2) and (B3).

Component (B3) has an aryl and/or aralkyl group bonded to a silicon atom in such that the percentage (%) of the number of the aryl groups relative to the total number of the hydrogen atoms and groups each bonded to a silicon atom is 8% to 50%. The percentage is preferably from 8 to 45%, and still more preferably from 8 to 40%. By the use of component (B3) having an aryl group in the above-mentioned range, the resulting cured coating show improved adhesion to a substrate. It is believed that component (B3) has low compatibility with components (A), (B4) and (B2) all having no aryl nor aralkyl group, and is localized near a substrate with the crosslinking reaction proceeding. Then, the SiH groups in component (B3) interact with functional groups present on the substrate surface. Particularly, in a case where the substrate is a plastic film, π-electrons of the aryl groups in component (B3) interact with π-electrons in the aromatic ring of the plastic, thereby improving the adhesion by the stacking effect.

If the percentage of the aryl groups is less than the lower limit indicated above, the resulting cured coating may not show good adhesion to a substrate. If the percentage exceeds the upper limit indicated above, the compatibility may be poor and storage stability of component (B) may be poor. As described above, the number of the aryl groups includes the number of the aryl groups present in the aralkyl groups. Examples of the group bonded to a silicon atom include hydroxy, alkyl, aryl and aralkyl groups, and alkyl groups substituted with halogen atom(s), and more specifically, groups represented by $R^1$ described below.

Preferably, component (B3) has an average polymerization degree of from 5 to 500, more preferably from 7 to 450, and still more preferably from 10 to 400. If the average polymerization degree exceeds the upper limit indicated above, the compatibility may be poor.

The organohydrogenpolysiloxane (B3) may be represented by, e.g., the following average compositional formula (1):

wherein $R^1$ is, independently of each other, a hydroxy group or a substituted or unsubstituted monovalent hydrocarbon group having no aliphatic unsaturated bond, wherein from 8% to 50%, in number, of $R^1$, relative to the total number of $R^1$ and the hydrogen atoms each bonded to a silicon atom, is an aryl group or aralkyl group, a and b are the number greater than 0, with a+b≤3.

Examples of the monovalent hydrocarbon group include alkyl groups, preferably, of 1 to 6 carbon atoms, such as methyl, ethyl, propyl and butyl groups; cycloalkyl groups, preferably, of 5 to 8 carbon atoms, such as cyclohexyl group; aryl groups, preferably, of 6 to 10 carbon atoms, such as phenyl and tolyl groups; aralkyl groups, preferably of 7 to 10 carbon atoms, such as a benzyl group; and monovalent hydrocarbon groups having 1 to 10 carbon atoms in which a part or all of hydrogen atoms each bonded to a carbon atom of the aforementioned groups are substituted with a substituent, such as a hydroxy or cyano group, a halogen atom, or an alkoxysilyl, polyoxyalkylene, epoxy or carboxyl group. At least one $R^1$ is an aryl or aralkyl group, preferably an aryl group. Among these, $R^1$ is preferably an alkyl or aryl group, and more preferably a methyl, ethyl, propyl or phenyl group.

Preferably, a is the number of from 0.1 to 2.0, b is the number of from 0.1 to 3.0, and more specifically a and b satisfy 0.5<a+b≤2.9.

Examples of the organohydrogenpolysiloxane of formula (1) above include polymers or copolymers comprising at least one of $R^1HSiO_{2/2}$, $HSiO_{3/2}$ and $R^1_2HSiO_{1/2}$ units and, optionally, one or more of $R^1_2SiO_{2/2}$, $R^1SiO_{3/2}$ and $R^1_3SiO_{1/2}$ units, wherein $R^1$ is as defined above. It preferably comprises at least three, more preferably at least five, $R^1HSiO_{2/2}$ and $R^1_2HSiO_{1/2}$ units in total per molecule. It may further comprise $SiO_{4/2}$ units in such an amount that the benefits of the invention are not impaired.

The organohydrogenpolysiloxane comprise 3 to 400, more preferably 5 to 300, SiH groups per molecule. If the number of the SiH groups is less than 3 or exceeds 400, the curability or adhesion may be worse.

The organohydrogenpolysiloxane (B3) may be any of linear chain, branched chain or cyclic, or a mixture thereof.

The organohydrogenpolysiloxane is preferably represented by the following formula (2):

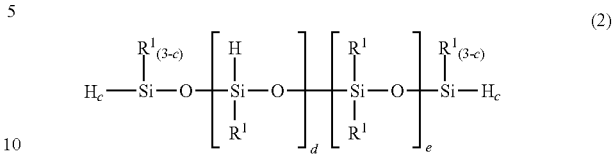

wherein $R^1$ is as defined above, c is 0 or 1, d and e are an integer satisfying 1≤d≤400 and 0≤e≤400, provided that 3≤2c+d≤400 and 5≤d+e≤498. The sequence of the siloxane units in parentheses is for an illustrative purpose only, and is not limited thereto or thereby.

Preferably, d is an integer of from 3 to 300, e is an integer of from 3 to 300, and c, d and e satisfy 5≤2c+d≤300 and 7≤d+e≤450.

Preferably, component (B3) has a viscosity at 25 degrees C. of 0.001 to 10 Pa·s, in particular 0.003 to 8 Pa·s, more preferably 0.005 to 5 Pa·s. If the viscosity is too low, good adhesion to the substrate may not be attained. If it is too high, compatibility may be poor.

Examples of component (B3) include, but not limited to, those shown below. In the formulas shown below, Me and Ph stand for a methyl group and a phenyl group, respectively. It should be noted that the sequence of the siloxane units in parentheses is for an illustrative purpose only, and is not limited thereto or thereby. In each formula shown below, the numbers of siloxane repeating units are average values.

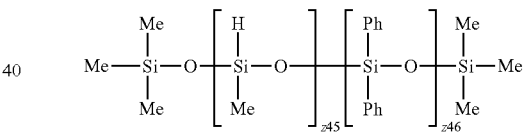

wherein 1≤z45≤398, 1≤z46≤250 and 5≤z45+z46≤498.

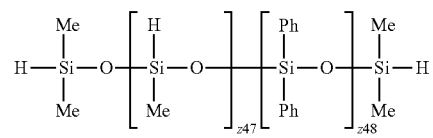

wherein 1≤z47≤398, 1≤z48≤250 and 5≤z47+z48≤498.

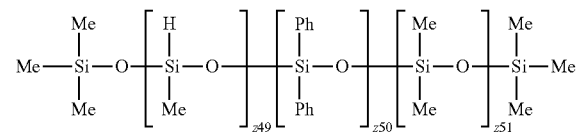

wherein 3≤z49≤400, 1≤z50≤250, 1≤z51≤200 and 5≤z49+z50+z51≤498.

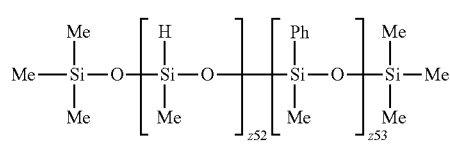
wherein 3≤z52≤400, 2≤z53≤400 and 5≤z52+z53≤498.
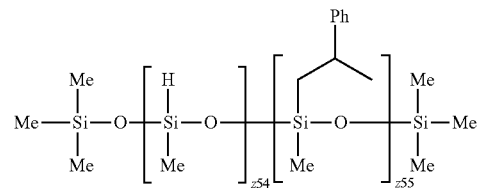
wherein 3≤z54≤400, 2≤z55≤400 and 5≤z54+z55≤498.
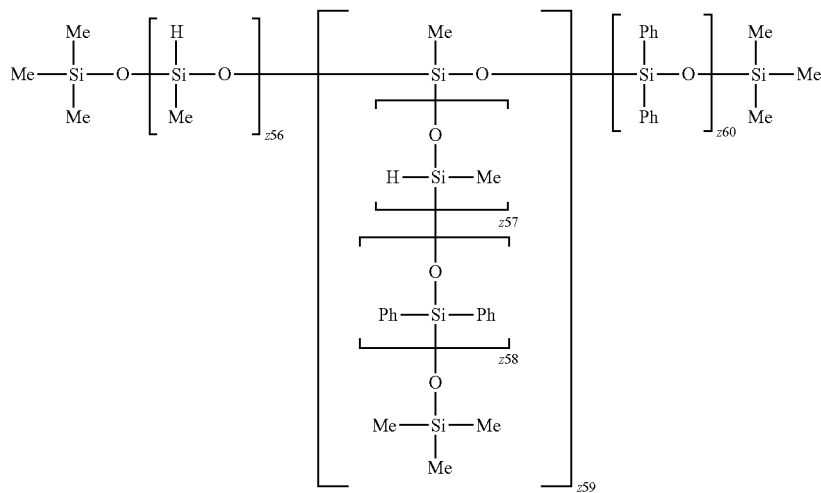
wherein 0≤z56≤100, 0≤z57≤100, 0≤z58≤100, 1≤z59≤50 and 0≤z60≤100, wherein the siloxane has an average polymerization degree of from 5 to 500, preferably from 7 to 450, more preferably from 10 to 400.
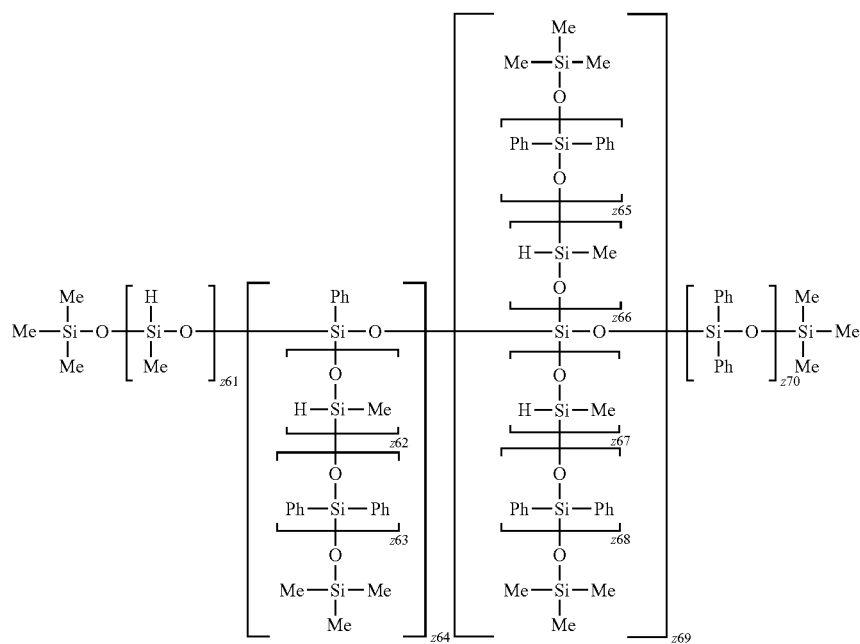

wherein $0 \leq z61 \leq 100$, $0 \leq z62 \leq 100$, $0 \leq z63 \leq z63 \leq 100$, $0 \leq z64 \leq 50$, $0 \leq z65 \leq 100$, $0 \leq z66 \leq 100$, $0 \leq z67 \leq 100$, $0 \leq z68 \leq 100$, $1 \leq z69 \leq 50$ and $0 \leq z70 \leq 100$, wherein the siloxane has an average polymerization degree of from 5 to 500, preferably 7 to 450, more preferably 10 to 400.

[(B4) Organopolysiloxane Having No Aryl Nor Aralkyl Group and Having 5% or More and Less than 35% of an Alkenyl Group]

The silicone composition of the present invention may further comprise (B4) an organopolysiloxane having at least two alkenyl groups each bonded to a silicon atom in a molecule, having a percentage of the number of the alkenyl group relative to a total number of groups each bonded to a silicon atom is from 5% to less than 35%, having a viscosity at 25 degrees C. in the range of from 1 mPa·s to 60 mPa·s, and having no aryl nor aralkyl group bonded to a silicon atom. The organopolysiloxane may be any alkenyl group-containing organopolysiloxane conventionally used in addition-curable silicone compositions.

Organopolysiloxane (B4) has at least two alkenyl groups. If it has less than two alkenyl groups, it is quite likely that uncrosslinked molecules remain after curing of the composition, resulting in undesirably low curability. Preferably, the percentage of the number of the alkenyl groups relative to the number of groups each bonded to a silicon atom is from 5% or more and less than 35%, and more preferably from 8% or more and less than 30%. If the percentage of the alkenyl group is less than the aforesaid lower limit, the chain length of organopolysiloxane (B4) is too long, so that the storage stability of component (B) may be worse. If the percentage of the alkenyl groups exceeds the upper limit indicated above, the resulting cured coating may be of heavy peeling and the remaining adhesive strength may decrease.

Component (B4) has a viscosity at 25 degrees C. in the range of from 1 mPa·s to 60 mPa·s, preferably 1 mPa·s to 50 mPa·s, and more preferably 2 mPa·s to 30 mPa·s. In a case where two or more of the organopolysiloxanes (B4) are used in combination, it is preferable that component (B4) as a whole has a viscosity of at most 60 mPa·s. If the viscosity exceeds this limit, the storage stability of component (B) may be undesirably low.

Component (B4) is preferably represented by the general formula (4) shown below. The organopolysiloxane may be used alone, or in combination of two or more of them. It should be noted that the sequence of the siloxane units shown in the parentheses is for an illustrative purpose only, and is not limited thereto or thereby.

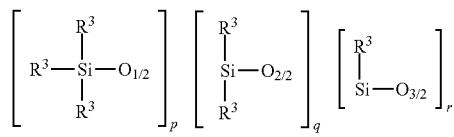

wherein, $R^3$ is as defined for $R^3$ of component (A). The organopolysiloxane has at least two alkenyl groups per molecule.

In the formula (4) above, p is an integer of at least 2, preferably from 2 to 100, q is an integer of at least 1, preferably 1 to 100, more preferably 5 to 50, r is an integer of at least 0, preferably 0 to 50, more preferably 0 to 30, s is an integer of at least 0, preferably 0 to 50, more preferably 0 to 30, and preferably $3 \leq p+q+r+s \leq 100$, preferably $5 \leq p+q+r+s \leq 80$, more preferably $5 \leq p+q+r+s \leq 50$. If the value of p+q+r+s is less than the lower limit, coating ability of the obtained composition may show poor. If the value of p+q+r+s exceeds the upper limit, the chain length of the polyorganosiloxane is too long, so that the storage stability of component (B) may be worse.

The amount of component (B4) is from 0.01 to 15 parts by mass, preferably from 0.1 to 10 parts by mass, relative to 100 parts by mass of component (A). If the amount exceeds the upper limit, the resulting cured coating may be of heavy peeling and remaining adhesive strength may decrease. It should be noted that component (B4) is an optional component, and the content may be 0 part by mass.

Examples of organopolysiloxane (B4) include, but not limited to, those shown below. In the formulas shown below, Me and Vi stand for a methyl group and a vinyl group, respectively. It should be also noted that the sequence of the siloxane units in parentheses is for an illustrative purpose only, and is not limited thereto or thereby.

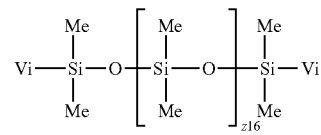

wherein $5 \leq z16 \leq 15$.

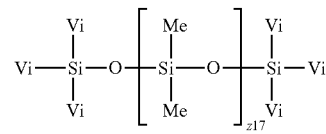

wherein $6 \leq z17 \leq 50$.

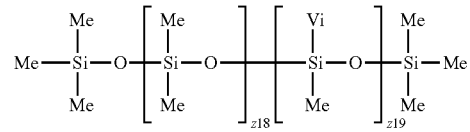

wherein $5 \leq z18 \leq 80$ and $2 \leq z19 \leq 10$.

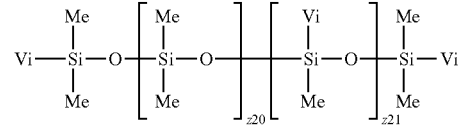

wherein $5 \leq z20 \leq 100$ and $1 \leq z21 \leq 10$.

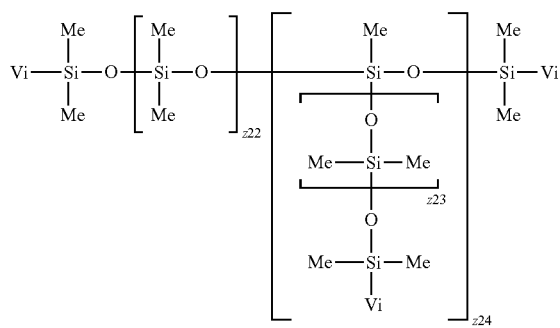

wherein $0 \leq z22 \leq 100$, $0 \leq z23 \leq 100$ and $1 \leq z24 \leq 50$.

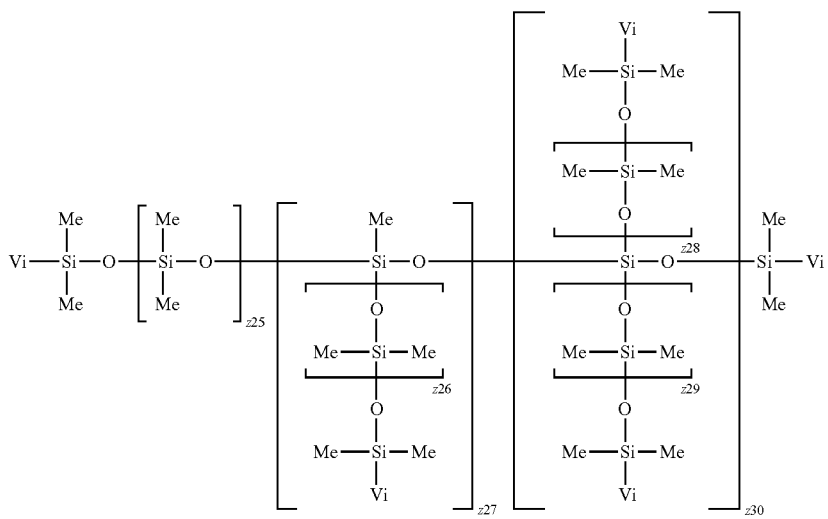

wherein $0 \leq z25 \leq 100$, $0 \leq z26 \leq 100$, $0 \leq z27 \leq 50$, $0 \leq z28 \leq 100$, $0 \leq z29 \leq 100$ and $1 \leq z30 \leq 50$.

Particularly, a ratio of the total number of the SiH groups in components (B2) and (B3) to the total number of the alkenyl groups in components (A) and (B1), that is, [total number of the SiH groups/total number of the alkenyl groups] is 0.8 to 10, preferably 0.8 to 5, more preferably 1.0 to 4.5, and still more preferably 1.2 to 4.0. When component (B4) is contained, it is preferable that the ratio of the total number of the SiH groups in the components (B2) and (B3) to the total number of the alkenyl groups in components (A), (B1) and (B4) satisfies the above range. If the ratio of the SiH group is less than the lower limit, the curing ability and adhesiveness of the silicone composition may be worse. If the ratio of the SiH group is larger than the aforesaid upper limit, the resulting cured coating may be of heavy peeling and the remaining adhesive strength may decrease.

The amount of the whole component (B) is preferably 0.5 to 20 parts by mass, particularly preferably 1 to 15 parts by mass, relative to 100 parts by mass of component (A). If the amount of component (B) exceeds the aforesaid upper limit, the cured coating may be of heavy peeling and the remaining adhesive strength may decrease. If the amount of component (B) is less than the aforesaid lower limit, good adhesion to a substrate may not be attained.

[(C) Platinum Group Metal Catalyst]

Component (C) is a catalyst for promoting the addition reaction of components (A), (B1) and (B2) and with component (B3) and (B4). The catalyst may be such known in the art that promotes the so-called hydrosilylation. Examples of the platinum group metal catalyst include platinum-based catalysts, palladium-based catalysts, rhodium-based catalysts and ruthenium-based catalysts. Among these, platinum-based catalysts are preferably used. Examples of the platinum-based catalyst include chloroplatinic acid, an alcohol or aldehyde solution of chloroplatinic acid, and complexes of chloroplatinic acid or platinum with a variety of olefins or vinylsiloxane.

Component (C) may be used in a catalytic amount. As used herein, the term "catalytic amount" is intended to mean an effective amount for promoting the addition reaction of component (A) with component (B). To obtain a good cured coating, it preferably ranges from 1 to 5,000 ppm by mass, in particular from 10 to 1,000 ppm by mass, of a platinum group metal, based on the total mass of components (A) and (B).

[Other Optional Components]

In addition to the aforesaid components, one or more other components may be added, if necessary, as long as the benefits of the invention are not impaired. Such other components may be any additives conventionally used in silicone compositions for release applications, and those well known in the art may be added in ordinary amounts. Examples will be described below. The following other components may be used alone, or in combination of two or more kinds of them.

(D) Pot Life Extender

The silicone composition of the present invention may further contain (D) a pot life extender to ensure a pot life. The pot life extender is not particularly limited as long as it has an effect of suppressing a curing effect by the platinum group metal catalyst (C), and may be conventional one. Examples of the pot life extender include various organic nitrogen compounds, organic phosphorus compounds, acetylenic compounds, oxime compounds, and organic chloro compounds.

Specific examples include acetlylenic alcohols, such as 3-methyl-1-butyn-3-ol, 3,5-dimethyl-1-hexyn-3-ol, 3-methyl-1-penten-3-ol, phenylbutynol and 1-ethynylcyclohexanol; acetylenic compounds, such as 3-methyl-3-1-penten-1-yne and 3,5-dimethyl-1-hexyn-3-yne; reaction products of these acetylenic compounds with alkoxysilanes or siloxanes or hydrogensilanes; vinylsiloxanes, such as tetramethylvinylsiloxane cyclics; organonitrogen compounds such as benzotriazole; and organophosphorus compounds, oxime compounds and organochlorine compounds. These compounds may be used in any suitable amount for providing a good pot life, preferably from 0.01 to 10 parts by mass, more preferably from 0.05 to 5 parts by mass, relative to total 100 parts by mass of components (A) and (B).

Component (D) may be added at the time of mixing components (A) to (C) (that is, a second step described below) or may be added in component (A) or (B) in advance and stored. When component (D) is added to component (B) in advance, component (B) is a mixture of components (B1) to (B3), component (D), and optional component (B4).

(E) Light Peeling Additives

In addition, the silicone composition of the present invention may comprise (E) a light peeling additive for the purpose of reducing a peel force. The light peeling additive is not particularly limited as long as it reduces the peeling force of the release sheet. Examples of the light peeling additives include an organopolysiloxane having no reactive functional group such as a hydrogen atom and an alkenyl group both bonded to a silicon atom. A preferred light peeling additive is an organopolysiloxane having a phenyl group in an amount of 2 to 10% of the total number of all substituents. Because component (E) has no functional group, it is not involved into crosslinking of the present silicone composition. Therefore, component (E) bleeds on the surface of the release layer to lower the peeling force. When the percentage of the phenyl group is within the aforesaid range, component (E) bleeds easier on the surface, which is preferable. If the percentage of the phenyl group is smaller than the aforesaid lower limit, the effect of bleeding on the surface of the cured film to reduce the peeling force is poor. If the percentage is larger than the aforesaid upper limit, compatibility of component (E) with components (A) to (C) may be poor.

The amount of component (E) is preferably 0.1 to 10 parts by mass, more preferably 0.5 to 5.0 parts by mass, relative to 100 parts by mass of component (A) for the purpose of reducing the peeling force. If the amount of component (E) is less than 0.1 parts by mass, the amount of component (E) bleeding on the surface may be too small and the peeling force is not sufficiently reduced. If the amount of component (E) is larger than 10 parts by mass, the amount of component (E) bleeding on the surface is too large, and the remaining adhesion ratio may decrease.

Component (E) may be added at the time of mixing components (A) to (C) (that is, a second step described below) or may be added to component (A) or (B) in advance and stored. When component (E) is added to component (B) in advance, component (B) is a mixture of components (B1) to (B3), component (E), and optional component (B4) and component (D).

Examples of component (E) include, but not limited to, those shown below. In the formulas shown below, Me and Ph stand for a methyl group and a phenyl group, respectively.

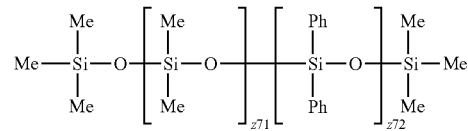

wherein $10 \leq z71 \leq 1000$ and $0 \leq z72 \leq 30$.

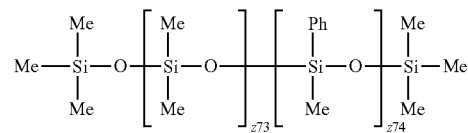

wherein $10 \leq z73 \leq 1000$ and $0 \leq z74 \leq 60$.

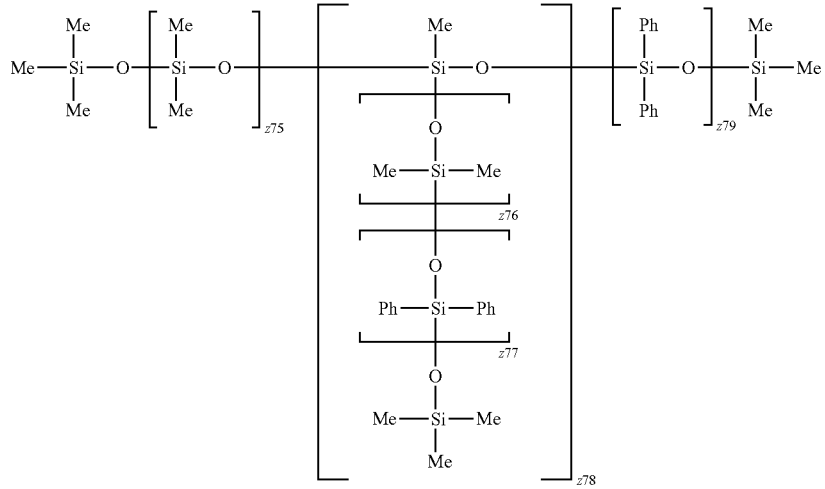

wherein $10 \leq z75 \leq 1000$, $0 \leq z76 \leq 1000$, $0 \leq z77 \leq 30$, $1 \leq z78 \leq 100$ and $0 \leq z79 \leq 30$.

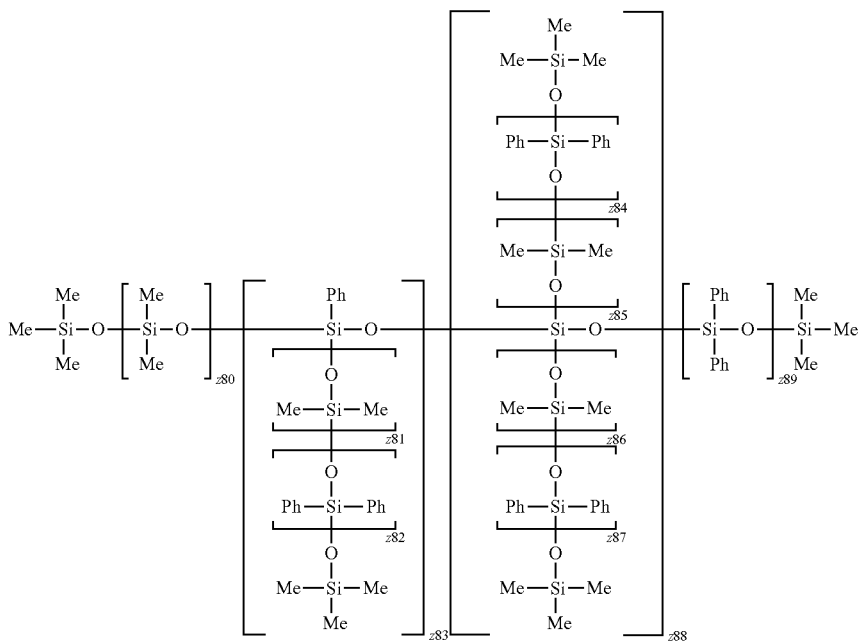

wherein $10 \leq z80 \leq 1000$, $0 \leq z81 \leq 1000$, $0 \leq z82 \leq 30$, $0 \leq z83 \leq 100$, $0 \leq z84 \leq 30$, $0 \leq z85 \leq 1000$, $0 \leq z86 \leq 1000$, $0 \leq z87 \leq 30$, $1 \leq z88 \leq 100$ and $0 \leq z89 \leq 30$.

Other Additives

If necessary, other additives known in the art, including antioxidants, light peeling additives, heavy peeling additives, pigments, stabilizers, antistatic agents, antifoaming agents, adhesion promoters, thickeners, solvents, and inorganic fillers such as silica may be further added as long as the benefits of the invention are not impaired.

<Method for Preparing a Release Sheet>

The release sheet of the present invention is obtained by a method comprising a first step of mixing components (B1), (B2) and (B3) and optional component (B4) to prepare component (B), a second step of mixing component (A), component (B) obtained in said first step and component (C) to obtain the silicone composition, a third step of applying the silicone composition on at least one surface of a substrate within 48 hours after obtaining the silicone composition and, thereby, forming a layer, and a fourth step of curing the layer to obtain the release layer.

When aforesaid optional component (D) or (E), or other optional component are incorporated, they may be mixed with components (A) to (C) in the second step, or may be added to component (B) and mixed in the first step in advance. The optional components may be added in advance to component (A). However, in view of the pot life, preferred is that component (D) or (E) or other optional component is mixed with component (B) in the first step, or that after the first step, components (A) and (B) and the optional component are mixed uniformly in advance and component (C) is then added to the mixture. However, if a small amount of component (A) even is mixed with component (B) in the first step, component (B3) may separate and the storage stability of component (B) may be worse, which is not preferable.

Component (B3) having an aryl group is not compatible with a silicone composition having no aryl nor aralkyl group. If components (A), (B3) and (B2) and optional component (B4) are mixed in advance and stored, component (B3) separates in several weeks to several months. In the present invention, components (B1) to (B4), component (A) and component (C) are separately stored. Then, the alpha-olefin (B1) functions as a compatibilizer in the mixture of components (B1) to (B4) (that is, component (B)). Therefore, component (B3) does not separate over time and long-term storage and transportation of the composition is possible. In other words, in the present invention, component (A), component (B) and component (C) are separately provided and stored and, then, mixed shortly before applied on a substrate. Therefore, a silicone composition capable of long-term storage and transportation is provided.

The silicone composition may be applied on the substrate surface in any method known in the art, for example, with a coater, such as comma coater, lip coater, roll coater, die coater, knife coater, blade coater, rod coater, kiss coater, gravure coater, and wire bar coater, or by a coating technique such as screen coating, dip coating and cast coating. The silicone composition may be applied on one or both surfaces of a sheet-like substrate, such as paper or a film, using any of the methods as described above. Typically, the coated amount of the silicone composition may be 0.01 to 100 g/m². Curing may be carried out under conditions known in the art. Typically, the curing condition includes from 1 to 120 seconds at a temperature of from 50 to 200 degrees C. In a case where release layers are formed on both surfaces of the substrate, it is preferable to form a cured coating on one side and then on the other side. The separation of component (B3) from the silicone composition prepared by mixing components (A) to (C) in the second step proceeds over time, such as for several weeks. Preferred is that the coating composition is applied on a substrate within 48 hours after mixing components (A) to (C).

Examples of the substrate include polyethylene film; polypropylene film, such as CPP and OPP films; polyester film, such as polyethylene terephthalate (PET) film; polyamide film; polyimide film; polylactic acid film; polyphenol film; and polycarbonate film. The substrate may be subjected to a pretreatment, such as corona treatment, etching treatment, or plasma treatment, in order to improve adhesion between the substrate and the cured coating.

The release layer formed from the present silicone composition comprises component (B3) which is interactive with a substrate and, therefore, the release layer has good adhesion to aforesaid film substrates.

EXAMPLES

The invention will be further described with reference to the following Examples and Comparative Examples, which should not to be construed to limit the scope of the present invention. It is noted that "part" is in mass.

Each component used in the Examples and Comparative Examples is shown below. As used hereinafter, a percentage of alkenyl groups (%) refers to a percentage of the number of alkenyl groups (Vi group in the formulas shown below) relative to the total number of groups each bonded to a silicon atom (Vi, Me and Ph groups in the formulas shown below). As used hereinafter, a percentage of aryl groups (%) refers to a percentage of the number of aryl groups (Ph group in the formulas shown below) relative to the total number of hydrogen atoms each bonded to a silicon atoms and groups each bonded to a silicon atom (Vi, Me and Ph groups in the formulas shown below). It should be noted that the sequence of the siloxane units shown in parentheses is for an illustrative purpose only, and is not limited thereto or thereby. The viscosity was measured by a rotary viscometer at 25 degrees C.

Component (A)

(A-1)

Percentage of the alkenyl groups: 0.65%, viscosity: 400 mPa·s

Component (B1)
(B1-1) 1-Tetradecene, LINEALENE 14, ex Idemitsu Kosan Co., Ltd.
(B1-2) 1-Hexadecene, LINEALENE 16, ex Idemitsu Kosan Co., Ltd.
(B1-3) Branched alpha-olefin represented by the following formula, HS-dimer A-20, ex Hokoku Corporation.

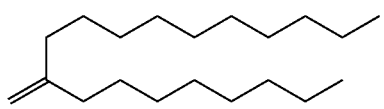 [SMILES: C=C(CCCCCCCC)CCCCCCCCCC]

(b1-1) A compound having a vinyl group at one terminal and a branched hydrocarbon group and represented by the following structure, for comparison

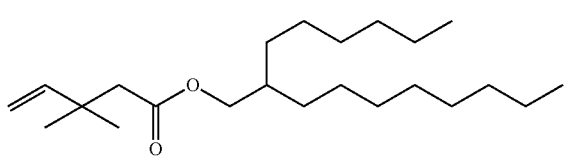 [SMILES: C=CC(C)(C)CC(=O)OCC(CCCCCC)CCCCCCCC]

Component (B2)

(B2-1)

Viscosity: 20 mPa·s

Component (B3)

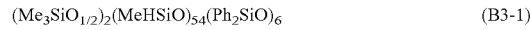
(B3-1)

Percentage of the aryl groups: 9.5%, viscosity: 100 mPa·s $(Me_3SiO_{1/2})_2(MeHSiO)_{310}(Ph_2SiO)_{35}$ (B3-2)

Percentage of the aryl groups: 10.1%, viscosity: 880 mPa·s $(Me_3SiO_{1/2})_2(MeHSiO)_{15}(Ph_2SiO)_6(Me_2SiO)_5$ (B3-3)

Percentage of the aryl groups: 20.7%, viscosity: 230 mPa·s $(Me_3SiO_{1/2})_2(MeHSiO)_{120}(Ph_2SiO)_6$ (b3-1)

Percentage of the aryl groups: 4.7%, viscosity: 90 mPa·s, for Comparative Example Component (B4)

(B4-1)

Percentage of the alkenyl groups: 7.7%, viscosity: 8 mPa·s $(ViMe_2SiO_{1/2})_{12}(MeSiO_{3/2})_{10}$ (B4-2)

Percentage of the alkenyl groups: 26.1%, viscosity: 20 mPa·s $(ViMe_2SiO_{1/2})_2(Me_2SiO)_{70}$ (b4-1)

Percentage of the alkenyl groups: 1.4%, viscosity: 100 mPa·s, for comparison (B) Catalyst: Platinum-Vinyl Siloxane Complex
(D) Pot Life Extender: 1-Ethynylcyclohexanol
(E) Component

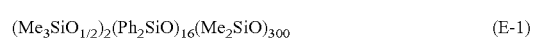
(E-1)

Percentage of the aryl groups: 5.0%, viscosity 3,000 mPa·s $(Me_3SiO_{1/2})_2(Ph_2SiO)_4(Me_2SiO)_{78}$ (E-2)

Percentage of the aryl groups: 4.7%, viscosity: 300 mPa·s

[Adhesion Promoter for Comparison]
Component (F)
(F-1) Organopolysiloxane Represented by the Following Formula:

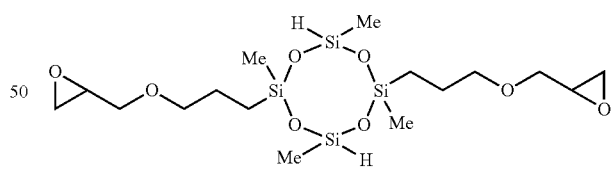

(F-2) Epoxy Group-Containing Organopolysiloxane

The adhesion promoter (F-2) (epoxy group-containing organopolysiloxane) disclosed in JP 2010-500462-A (Patent Literature 4) was synthesized as follows:

43% By mass of an organopolysiloxane with a viscosity at 25 degrees C. of 20 mm²/s, composed of 20 mol % of silanol-terminated siloxane units $(CH_3)_2(OH)SiO_{1/2}$, 40 mol % of methylvinylsiloxane units $(CH_3)(CH_2=CH)SiO_{2/2}$ and 40 mol % of dimethylsiloxane units $(CH_3)_2SiO_{2/2}$ was reacted with 57% by mass of 2-(3,4-epoxycyclohexyl)ethyltrimethoxysilane in the presence of potassium silanolate at 100 degrees C. for 1 hour to obtain an epoxy group-containing organopolysiloxane.

The organopolysiloxane had a viscosity of 0.6 Pa·s at 25 degrees C. and had an alkenyl content of 0.20 mol/100 g.

Examples 1 to 8 and Comparative Examples 1 to 8

Preparation of a Mixture (B), First Step

Components (B1) to (B4), component (D) and, if any, optional components (E) and (F) shown above were put into a glass bottle in the amounts described in Table 1 or 2 below, and stirred to dissolve to obtain a mixture (B). The appearance and the storage stability of the obtained mixture (B) were confirmed according to the methods described below.

Further, the mixture (B) obtained in the first step was added to 100 parts by mass of component (A). Then, component (C) was added to the resulting mixture in an amount of 100 ppm by mass of platinum relative to the total mass of component (A) and the mixture (B), and mixed under stirring to obtain a silicone composition (second step). This silicone composition was used for the preparation of a coated article (release film) and evaluated according to the methods described below.

<Evaluation>
[Appearance]

The mixture (B) obtained in the first step was placed in a 25 g wide-mouth transparent glass bottle, ex Horiuchi Garasu Co., Ltd., and the appearance (transparency) was evaluated according to the following criteria.
  A: Transparent: an object is seen clearly through the bottle.
  B: Translucent: the outline of an object is seen through the bottle.
  C: Untransparent: an object on the other side of the bottle is not seen at all through the bottle.

[Storage Stability]

The mixture (B) obtained in the first step was placed in a 25 g wide-mouth transparent glass bottle, ex Horiuchi Garasu Co., Ltd., and stored at 5 degrees C. for 14 days. The appearance was evaluated according to the following criteria.
  A: Good: no separation of any component was seen and transparency was maintained.
  C: Poor: separation of a component was seen or the appearance changed to translucent or untransparent.

[Peeling Force]

The composition obtained in the second step was applied, within 48 hours after the preparation, on a PET film having a thickness of 38 μm in an amount of solids of 0.6 g/m² by means of a gravure coater, and cured by heating in a hot air dryer at 120 degrees C. for 40 seconds to form a release layer. The release layer was evaluated according to the FINAT method in the following procedures.

An adhesive tape of 25 mm width (Tesa 7475 tape, commercially available from Tesa Tape Inc.) was applied on the surface of the release layer, and subjected to a heat treatment under a load of 20 g/cm² in a dryer at 70 degrees C. for 20 hours. After air-cooled for 30 minutes, the Tesa 7475 tape was pulled by a tensile tester (AGS-50G type, ex SHIMADZU CORPORATION) at an angle of 180° and a peeling speed of 0.3 m/min to determine a force (in gf/25 mm) required for peeling it. The results are shown in Tables 1 and 2.

[Remaining Adhesion]

The Tesa 7475 tape which had been subjected to the peeling test described above was applied on an SUS stainless steel plate, and pressed with a 2-kg tape roller in one cycle of moving back and forth. The tape was peeled off with a tensile tester (AGS-50G type, ex SHIMADZU CORPORATION) at an angle of 180° and at a speed of 0.3 m/min to determine a force F (in N/25 mm) required for peeling it. For comparison, an unused Tesa 7475 tape was applied on an SUS plate and a force $F_0$ (in N/25 mm) required for peeling it was determined in the same manner. Remaining adhesion (%), i.e., percentage of the adhesion remaining in the Tesa 7475 tape after the removal from the release layer, relative to the adhesion of the unused Tesa 7475 tape, was calculated by the equation: $F/F_0 \times 100$. The results are shown in Tables 1 and 2.

[Adhesion after Aging at High Temperature and a High Humidity]

A release layer was formed on a PET film having a thickness of 38 μm in the same manner as described above, and stored for 3 days at 60 degrees C. and 90% RH. After storing for 3 days, the release layer was rubbed with a finger in ten strokes to see by visual inspection if the release layer was rubbed off or not, and evaluated on the following criteria.
  A: no rub-off occurred.
  C: rub-off occurred.
The results are shown in Tables 1 and 2.

[Transparency of the Coating]

A release layer was formed on a PET film having a thickness of 38 μm in the same manner as described above, and haze (%) of the coating of a 0.6 μm thickness was determined with a haze meter (NDH5000SP, ex Nippon Denshoku Industries Co., Ltd.) according to JIS K 7136 (Determination of haze for plastic-transparent materials). The results are shown in Tables 1 and 2.
Haze is defined as a ratio of a diffuse transmittance to a total light transmittance. A lower haze (%) indicates a higher level of transparency.

TABLE 1

| | Part by mass | Example | | | | | | | |
|---|---|---|---|---|---|---|---|---|---|
| | | 1 | 2 | 3 | 4 | 5 | 6 | 7 | 8 |
| Component (A) | (A-1) Alkenyl group: 0.65%, viscosity: 400 mPa·s | 100 | 100 | 100 | 100 | 100 | 100 | 100 | 100 |
| Mixture (B) | (B1-1) 1-Tetradecene | 2.5 | | | | | | | |
| | (B1-2) 1-Hexadecene | | 2.5 | | 0.5 | 1.5 | 5.2 | 5.2 | 5.2 |
| | (B1-3) Branched alpha-olefin | | | 2.5 | | | | | |
| | (B2-1) | 1.5 | 1.5 | 1.5 | 1.6 | 1.4 | 2.7 | 2.7 | 2.7 |
| | (B3-1) Ph group: 9.5% | 2.0 | 2.0 | 2.0 | 2.0 | 2.0 | 2.0 | | |

TABLE 1-continued

| Part by mass | | Example | | | | | | | |
|---|---|---|---|---|---|---|---|---|---|
| | | 1 | 2 | 3 | 4 | 5 | 6 | 7 | 8 |
| | (B3-2) Ph group: 10.1% | | | | | | | 2.0 | |
| | (B3-3) Ph group: 20.7% | | | | | | | | 2.0 |
| | (B4-1) Alkenyl group: 7.7%, viscosity: 8 mPa·s | | | | 4.8 | | | | |
| | (B4-2) Alkenyl group: 26.1%, viscosity: 20 mPa·s | | | | | 1.0 | | | |
| | (D) | 0.1 | 0.1 | 0.1 | 0.1 | 0.1 | 0.1 | 0.1 | 0.1 |
| | (E-1) | 0.9 | 0.9 | 0.9 | | | | | |
| | (E-2) | | | | 1.0 | 1.0 | | | |
| | Appearance | A | A | A | A | A | A | A | A |
| | Storage stability | A | A | A | A | A | A | A | A |
| H/Vi ratio in number [(B2) + (B3)]/[(A) + (B4) + (B1)] | | 1.5 | 1.6 | 1.7 | 1.6 | 1.5 | 1.6 | 1.6 | 1.3 |
| H/Vi ratio in number [(B2)]/[(A) + (B4) + (B1)] | | 0.7 | 0.8 | 0.8 | 0.8 | 0.7 | 1.0 | 1.0 | 1.0 |
| H/Vi ratio in number [(B3)]/[(A) + (B4) + (B1)] | | 0.8 | 0.9 | 0.9 | 0.8 | 0.8 | 0.6 | 0.6 | 0.3 |
| | Peeling force, gf/25 mm | 9.3 | 7.0 | 8.7 | 9.5 | 5.9 | 28.5 | 19.8 | 37.2 |
| | Remaining adhesion, % | 82 | 83 | 83 | 89 | 72 | 100 | 96 | 95 |
| | Haze, % | 2.60 | 2.65 | 2.71 | 2.65 | 2.59 | 2.65 | 2.71 | 2.65 |
| Adhesion after aging at 60 degrees C. and 90%RH | 0 day, initial | A | A | A | A | A | A | A | A |
| | After 3 days | A | A | A | A | A | A | A | A |

TABLE 2

| | Part by mass | Comparative Example | | | | | | |
|---|---|---|---|---|---|---|---|---|
| | | 1 | 2 | 3 | 4 | 5 | 6 | 7 |
| Component (A) | (A-1) Alkenyl group: 0.65%, viscosity: 400 mPa·s | 100 | 100 | 100 | 100 | 100 | 100 | 100 |
| Mixture (B) | (B1-2) 1-Hexadecene | | 2.9 | 4.9 | | 5.2 | 5.2 | 5.2 |
| | (b1-1) Compatibilizer | 2.5 | | | | | | |
| | (B2-1) | 1.5 | 0.6 | 3.0 | 1.5 | 2.7 | 2.7 | 2.7 |
| | (B3-1) Ph group: 9.5% | 2.0 | 3.5 | | 2.0 | | | |
| | (b3-1) Ph group: 4.7% | | | | | 2.0 | | |
| | (F-1) Adhesion promoter | | | | | | 2.0 | |
| | (F-2) Adhesion promoter | | | | | | | 2.0 |
| | (B4-1) Alkenyl group: 7.7%, viscosity: 8 mPa·s | | | | 5.4 | | | |
| | (D) Pot life extender | 0.1 | 0.1 | 0.1 | 0.1 | 0.1 | 0.1 | 0.1 |
| | (E-1) Ph group: 5%, viscosity: 3000 mPa·s | 0.9 | 0.9 | 1.0 | | | | |
| | (E-2) Ph group: 4.7%, viscosity: 300 mPa·s | | | | 1.0 | | | |
| | Appearance | C | A | A | A | A | B | A |
| | Storage stability | C | A | A | C | A | C | C |
| H/Vi ratio in number [(B2) + (B3)]/[(A) + (B4) + (B1)] | | 1.9 | 1.7 | 1.1 | 1.6 | 1.7 | 1.2 | 0.9 |
| H/Vi ratio in number [(B2)]/[(A) + (B4) + (B1)] | | 0.9 | 0.3 | 1.1 | 0.8 | 1.0 | 1.0 | 0.9 |
| H/Vi ratio in number | | 1.0 | 1.4 | 0 | 0.8 | 0.7 | 0 | 0 |
| | Peeling force, gf/25mm | 9.1 | 9.1 | 22.6 | 9.5 | 54.6 | 23.9 | 17.3 |
| | Remaining adhesion, % | 78 | 75 | 80 | 89 | 95 | 92 | 97 |
| | Haze, % | 2.64 | 2.62 | 2.61 | 2.65 | 2.61 | 2.72 | 2.70 |
| Adhesion after aging at 60 degrees C. and 90%RH | 0 day, initial | A | A | A | A | A | A | C |
| | After 3 days | A | C | C | A | C | C | C |

As shown in Table 2, the silicone composition of Comparative Example 1 in which the compatibilizer was not an alpha-olefin and the silicone composition of Comparative Example 4 in which no alpha-olefin was incorporated were excellent in adhesiveness but poor in storage stability. The silicone composition of Comparative Example 2 in which the amount of component (B2) was small, the silicone composition of Comparative Example 3 in which component (B3) was not incorporated, and the silicone composition of Comparative Example 5 in which the organohydrogenpolysiloxane having the small amount of aryl groups was used instead of component (B3) were excellent in storage stability but poor in adhesiveness. The silicone composition of Comparative Examples 6 and 7 in which a conventional adhesion improver was used instead of component (B3) showed poor storage stability and adhesion.

As shown in Table 1, the silicone compositions comprising the present component (B) had high storage stability, so that long-term storage and transportation are allowable without separation of component (B3) over time. Further, as shown in Table 1, even though the present silicone compositions were free of a solvent, the cured films obtained from the silicone compositions had excellent adhesion to the plastic film substrate.

INDUSTRIAL APPLICABILITY

According to the present invention, the silicone composition has high storage stability and serves suitably as a solvent-free-type releasing agent. The silicone composition may be used to form a cured coating on a surface of a film substrate such as a plastic substrate, with good adhesion to the substrate, to give a release film.

The invention claimed is:

1. A silicone composition comprising the following components (A) to (C):
    (A) an organopolysiloxane having at least two alkenyl groups each bonded to a silicon atom in a molecule, having a viscosity at 25 degrees C. in the range of from 50 mPa·s to 10,000 mPa·s, and having no aryl nor aralkyl group bonded to a silicon atom, wherein a percentage of the number of the alkenyl groups relative to the number of groups each bonded to a silicon atom is from 0.01% to less than 4.5%;
    (B) a mixture comprising the following components (B1), (B2) and (B3):
        (B1) an alpha-olefin which is liquid at 25 degrees C., in an amount of 0.05 to 15 parts by mass, relative to 100 parts by mass of component (A),
        (B2) an organohydrogenpolysiloxane having at least three hydrogen atoms each bonded to a silicon atom in a molecule, and having no aryl nor aralkyl group bonded to a silicon atom, wherein a ratio of the number of the SiH groups present in component (B2) to a total number of the alkenyl groups present in components (A) and (B) is 0.5 to 10;
        (B3) an organohydrogenpolysiloxane having at least three hydrogen atoms each bonded to a silicon atom in a molecule, and having an aryl group and/or an aralkyl group each bonded to a silicon atom such that a percentage of the number of the aryl group and the aralkyl group relative to a total number of hydrogen atoms and groups each bonded to a silicon atom is 8% to 50%, wherein the amount of component (B3) is from 0.05 to 10 parts by mass, relative to 100 parts by mass of component (A), and a ratio of the number of the SiH groups present in component (B3) to a total number of the alkenyl groups present in components (A) and (B) is 0.1 to 2; and
    (C) a catalytic amount of a platinum group metal catalyst.

2. The silicone composition according to claim 1, wherein component (B) further comprises (B4) an organopolysiloxane having at least two alkenyl groups each bonded to a silicon atom in a molecule, having a percentage of the number of the alkenyl group relative to a total number of groups each bonded to a silicon atom is from 5% to less than 35%, having a viscosity at 25 degrees C. in the range of from 1 mPa·s to 60 mPa·s, and having no aryl nor aralkyl group bonded to a silicon atom, in an amount of 0.01 to 15 parts by mass, relative to 100 parts by mass of component (A).

3. The silicone composition according to claim 2, wherein a ratio of the total number of the SiH groups in components (B2) and (B3) to a total number of the alkenyl groups in components (A), (B1) and, if any, (B4) is 0.8 to 10.

4. The silicone composition according to claim 2, wherein component (B3) has the following average compositional formula (1):

$$R^1_a H_b SiO_{(4-a-b)/2} \quad (1)$$

wherein $R^1$ is, independently of each other, a hydroxy group or a substituted or unsubstituted monovalent hydrocarbon group having no aliphatic unsaturated bond, wherein from 8 to 50% of the number of $R^1$ relative to a total number of $R^1$ and the hydrogen atoms each bonded to a silicon atom is an aryl or aralkyl group, and a and b are numbers greater than 0, provided that a+b≤3.

5. The silicone composition according to claim 2, wherein component (B3) has an average polymerization degree of from 5 to 500.

6. The silicone composition according to claim 2, wherein the composition is free of a solvent.

7. The silicone composition according to claim 1, wherein a ratio of the total number of the SiH groups in components (B2) and (B3) to a total number of the alkenyl groups in components (A), (B1) and, if any, (B4) is 0.8 to 10.

8. The silicone composition according to claim 7, wherein component (B3) has the following average compositional formula (1):

$$R^1_a H_b SiO_{(4-a-b)/2} \quad (1)$$

wherein $R^1$ is, independently of each other, a hydroxy group or a substituted or unsubstituted monovalent hydrocarbon group having no aliphatic unsaturated bond, wherein from 8 to 50% of the number of $R^1$ relative to a total number of $R^1$ and the hydrogen atoms each bonded to a silicon atom is an aryl or aralkyl group, and a and b are numbers greater than 0, provided that a+b≤3.

9. The silicone composition according to claim 7, wherein component (B3) has an average polymerization degree of from 5 to 500.

10. The silicone composition according to claim 1, wherein component (B3) has the following average compositional formula (1):

$$R^1_a H_b SiO_{(4-a-b)/2} \quad (1)$$

wherein $R^1$ is, independently of each other, a hydroxy group or a substituted or unsubstituted monovalent hydrocarbon group having no aliphatic unsaturated bond, wherein from 8 to 50% of the number of $R^1$ relative to a total number of $R^1$ and the hydrogen atoms each bonded to a silicon atom is an aryl or aralkyl group, and a and b are numbers greater than 0, provided that a+b≤3.

11. The silicone composition according to claim 10, wherein component (B3) is represented by the following formula (2):

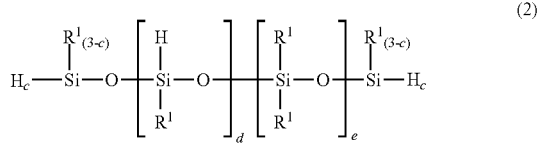

(2)

wherein $R^1$ is as defined above, c is 0 or 1, and d and e are integers satisfying the equations, $1 \leq d \leq 400$ and $0 \leq e \leq 400$, provided that $3 \leq 2c+d \leq 400$ and $5 \leq d+e \leq 498$.

12. The silicone composition according to claim 1, wherein component (B3) has an average polymerization degree of from 5 to 500.

13. The silicone composition according to claim 12, wherein component (B3) is represented by the following formula (2):

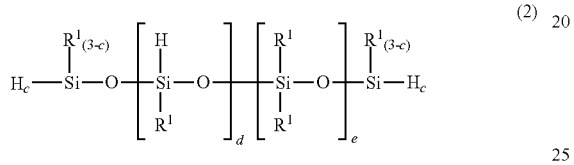

(2)

wherein $R^1$ is as defined above, c is 0 or 1, and d and e are integers satisfying the equations, $1 \leq d \leq 400$ and $0 \leq e \leq 400$, provided that $3 \leq 2c+d \leq 400$ and $5 \leq d+e \leq 498$.

14. The silicone composition according to claim 1, wherein the composition is free of a solvent.

15. A release sheet comprising a substrate and a release layer on at least one surface of the substrate, wherein the release layer is formed from a cured product of the silicone composition according to claim 1.

16. A release film comprising a plastic film substrate and a release layer on at least one surface of the plastic film substrate, wherein the release layer is formed from a cured product of the silicone composition according to claim 1.

17. A release sheet comprising a substrate and a release layer on at least one surface of the substrate, wherein the release layer is formed from a cured product of the silicone composition according to claim 2.

18. A release film comprising a plastic film substrate and a release layer on at least one surface of the plastic film substrate, wherein the release layer is formed from a cured product of the silicone composition according to claim 2.

19. A method for preparing the release film according to claim 16, comprising
 a first step of mixing components (B1), (B2) and (B3) and optional component (B4) to prepare the mixture (B),
 a second step of mixing component (A), the mixture (B) obtained in said first step and component (C) to obtain the silicone composition,
 a third step of applying the silicone composition on at least one surface of said substrate within 48 hours after obtaining the silicone composition and, thereby, forming a layer, and
 a fourth step of curing the layer to obtain the release layer.

20. A method for preparing the release sheet according to claim 15, comprising
 a first step of mixing components (B1), (B2) and (B3) and optional component (B4) to prepare the mixture (B),
 a second step of mixing component (A), the mixture (B) obtained in said first step and component (C) to obtain the silicone composition,
 a third step of applying the silicone composition on at least one surface of said substrate within 48 hours after obtaining the silicone composition and, thereby, forming a layer, and
 a fourth step of curing the layer to obtain the release layer.

* * * * *

UNITED STATES PATENT AND TRADEMARK OFFICE
CERTIFICATE OF CORRECTION

PATENT NO. : 11,884,778 B2
APPLICATION NO. : 17/256724
DATED : January 30, 2024
INVENTOR(S) : Kobayashi et al.

Page 1 of 2

It is certified that error appears in the above-identified patent and that said Letters Patent is hereby corrected as shown below:

In the Specification

Column 14, Line 23: Please correct "10 Pa-s" to read --10 Pa·s--

Column 26, Line 32: Please correct "(B) Catalyst" to read --(C) Catalyst--

Signed and Sealed this
Sixth Day of August, 2024

Katherine Kelly Vidal
*Director of the United States Patent and Trademark Office*

Column 29, Table 2: Please delete Table 2 and replace with the following:

| Part by mass | | Comparative Example | | | | | | |
|---|---|---|---|---|---|---|---|---|
| | | 1 | 2 | 3 | 4 | 5 | 6 | 7 |
| Component (A) | (A-1) Alkenyl group: 0.65%, viscosity: 400 mPa·s | 100 | 100 | 100 | 100 | 100 | 100 | 100 |
| Mixture (B) | (B1-2) 1-Hexadecene | | 2.9 | 4.9 | | 5.2 | 5.2 | 5.2 |
| | (b1-1) Compatibilizer | 2.5 | | | | | | |
| | (B2-1) | 1.5 | 0.6 | 3.0 | 1.5 | 2.7 | 2.7 | 2.7 |
| | (B3-1) Ph group:9.5% | 2.0 | 3.5 | | 2.0 | | | |
| | (b3-1) Ph group:4.7% | | | | | 2.0 | | |
| | (F-1) Adhesion promoter | | | | | | 2.0 | |
| | (F-2) Adhesion promoter | | | | | | | 2.0 |
| | (B4-1) Alkenyl group:7.7%, viscosity:8mPa·s | | | | 5.4 | | | |
| | (D) Pot life extender | 0.1 | 0.1 | 0.1 | 0.1 | 0.1 | 0.1 | 0.1 |
| | (E-1) Ph group: 5%, viscosity:3000mPa·s | 0.9 | 0.9 | 1.0 | | | | |
| | (E-2) Ph group: 4.7%, viscosity:300mPa·s | | | | 1.0 | | | |
| | Appearance | C | A | A | A | A | B | A |
| | Storage stability | C | A | A | C | A | C | C |
| H/Vi ratio in number [(B2)+(B3)]/[(A)+(B4)+(B1)] | | 1.9 | 1.7 | 1.1 | 1.6 | 1.7 | 1.2 | 0.9 |
| H/Vi ratio in number [(B2)]/[(A)+(B4)+(B1)] | | 0.9 | 0.3 | 1.1 | 0.8 | 1.0 | 1.0 | 0.9 |
| H/Vi ratio in number [(B3)]/[(A)+(B4)+(B1)] | | 1.0 | 1.4 | 0 | 0.8 | 0.7 | 0 | 0 |
| Peeling force, gf/25mm | | 9.1 | 9.1 | 22.6 | 9.5 | 54.6 | 23.9 | 17.3 |
| Remaining adhesion, % | | 78 | 75 | 80 | 89 | 95 | 92 | 97 |
| Haze, % | | 2.64 | 2.62 | 2.61 | 2.65 | 2.61 | 2.72 | 2.70 |
| Adhesion after aging at 60degrees C and 90%RH | 0 day, initial | A | A | C | A | A | A | C |
| | After 3 days | A | C | C | A | C | C | C |